United States Patent [19]

Satoyama

[11] Patent Number: 5,404,441
[45] Date of Patent: Apr. 4, 1995

[54] METHOD AND APPARATUS FOR AUTOMATICALLY GENERATING A GRAPHICAL USER INTERFACE CONTROL PROGRAM

[75] Inventor: Motoaki Satoyama, Sagamihara, Japan

[73] Assignee: Hitachi, Ltd., Tokyo, Japan

[21] Appl. No.: 80,802

[22] Filed: Jun. 21, 1993

[30] Foreign Application Priority Data

Jun. 23, 1992 [JP] Japan .................. 4-164682

[51] Int. Cl.$^6$ ........................................... G06F 3/153
[52] U.S. Cl. .................... 395/155; 395/157; 395/161
[58] Field of Search ............... 395/155, 157, 158, 161; 340/712

[56] References Cited

U.S. PATENT DOCUMENTS 5,041,992  8/1991  Cunningham et al. .......... 395/155 X
5,148,155  9/1992  Martin et al. ................... 340/712 X

OTHER PUBLICATIONS

Norton Desktop for Windows (Trademark of Sybex), 1992, pp. xiii–xv, 1, 37–41, 91, 139; pp. 1–4 of "NWD.INI"; pp. 1–13 of Ndwini.txt.

Microsoft Windows User's Guide (Trademark of Microsoft Cor.), 1991, pp. 441, 445, 448–449, & 457–474.
"OSF/Motif Programmer's Guide," Revision 1.1, Open Software Foundation, Prentice-Hall, Inc., 1990, 1991, pp. 1-1 through 3-7. (English).

Primary Examiner—Mark K. Zimmerman
Assistant Examiner—Cliff Nguyen Vo
Attorney, Agent, or Firm—Fay, Sharpe, Beall, Fagan, Minnich & McKee

[57] ABSTRACT

A method and apparatus are provided for automatically generating a graphical user interface control program. Part definition information is read which defines display parts of a user interface such as a main window, a button switch, a sub-window and a dialog box, size and position information of the parts, and information defining relevancy of the parts. The part definition information, position information and relevancy information are recognized from the read information. A relational structure between the part structure and the parts is analyzed based on the recognized part definition information, position information and the relevancy information. A procedure for constructing a graphical user interface control program is generated based on the part definition information, the position information, the relevancy information and the relational structure between the part structure and the parts resulting from the analysis.

5 Claims, 17 Drawing Sheets

FIG.3

| CONTENT OF PROCESS | FUNCTION NAME | ARGUMENT | |
|---|---|---|---|
| GENERATION OF Main Window | CreateMainWindow | PART NAME | ~1503'-1 |
| GENERATION OF Button | CreateButton | PART NAME | ~1503'-2 |
| GENERATION OF Dialog Box | CreateDialogBox | PART NAME | ~1503'-3 |
| GENERATION OF Text Field | CreateTextField | PART NAME | ~1503'-4 |
| SETTING OF COORDINATES | setPosition | PART NAME, X COORDINATE, Y COORDINATE | ~1504' |
| SETTING OF SIZE | setSize | PART NAME, WIDTH, HEGHT | ~1505' |
| SETTING OF LABEL | setLabel | PART NAME, LABEL CHARACTER STRING | ~1506' |
| SETTING OF INITIAL DISPLAY STATUS | setDefaultMap | PART NAME, Unmap or Map | ~1507' |
| SETTING OF CALLBACK FUNCTION | setCallbackFunction | PART NAME, FUNCTION NAME | ~1508' |
| SETTING OF SUB-WINDOW | setSubwindow | PART NAME, PART NAME OF SUB-WINDOW | ~1510' |
| SETTING OF ON-SELECT DISPLAY WINDOW | setMapOnSelect | PART NAME, PART NAME ON DISPLAY | ~1511' |
| SETTING OF ON-SELECT NON-DISPLAY WINDOW | setUnmapOnSelect | PART NAME, PART NAME ON NON-DISPLAY | ~1512' |

Columns: 1701, 1702, 1703

FIG.13

| | 1200A | 1200B | 1200C | 1200D | 1200E | |
|---|---|---|---|---|---|---|
| 1201 — PART NAME | main_win | btn1 | dialog | text | btn2 | ⎫ |
| 1202 — PART TYPE NAME | MainWindow | button | DialogBox | TextField | Button | ⎬ 1210 |
| 1203 — CALL BACK FUNC. | | | | input | unmapDialog | ⎬ |
| 1204 — INITIAL DISPLAY STATUS | DISPLAY | DISPLAY | NON-DISPLAY | DISPLAY | DISPLAY | ⎭ |
| GRAPHIC TYPE | DOUBLE RECTANGLE | DOUBLE RECTANGLE | DOUBLE RECTANGLE | DOUBLE RECTANGLE | DOUBLE RECTANGLE | ⎫ |
| X COORDINATE | 20 | 30 | 70 | 20 | 100 | |
| Y COORDINATE | 10 | 50 | 150 | 30 | 50 | ⎬ 1220 |
| WIDTH | 500 | 200 | 400 | 300 | 200 | |
| HEIGHT | 500 | 70 | 360 | 150 | 100 | |
| CHARACTER STRING | | FILE | | | OK | ⎭ |
| GRAPHC TYPE | RECTANGLE | RECTANGLE | RECTANGLE | | RECTANGLE | ⎫ |
| X COORDINATE | 10 | 120 | 270 | | 80 | |
| Y COORDINATE | 30 | 250 | 300 | | 300 | ⎬ 1230 |
| WIDTH | 100 | 300 | 80 | | 320 | |
| HEIGHT | 30 | 230 | 30 | | 150 | |
| CHARACTER STRING | btn1 | dialog | btn2 | | dialog | ⎭ |
| GRAPHC TYPE | | SOLID LINE ARROW | RECTANGLE | | BROKEN LINE ARROW | ⎫ |
| X COORDINATE | | 180 | 90 | | 230 | |
| Y COORDINATE | | 200 | 160 | | 140 | ⎬ 1240 |
| WIDTH | | 10 | 300 | | 80 | |
| HEIGHT | | 160 | 150 | | 220 | |
| CHARACTER STRING | | | text | | | ⎭ |

FIG.15

| RECORD No. | #1 | #2 | #3 | #4 | #5 |
|---|---|---|---|---|---|
| PART NAME | Main_Win | btn1 | dialog | btn2 | text |
| PART TYPE NAME | MainWindow | Button | DialogBox | Button | TextField |
| LABEL | | FILE | | OK | |
| POSITION | (20,10) | (10,30) | (80, 200) | (270, 300) | (90, 160) |
| SIZE | (500, 500) | (200, 70) | (400, 360) | (200, 100) | (300, 150) |
| SUB-WINDOW | btn1 | | btn2,text | | |
| DISPLAY ON SELECT | | dialog | | | |
| NON-DISPLAY ON SELECT | | | | dialog | |
| CALL BACK FUNCTION | | | | unmapDialog | input |
| INITIAL DISPLAY | DISPLAY | DISPLAY | NON-DISPLAY | DISPLAY | DISPLAY |

FIG.17

```
main 0
{
    CreteMainWindow ( main_win )              ~1503A
    setPosition ( main_win, 20, 10 )          ~1504A
    SetSize ( main_win, 500, 500 )            ~1505A
    CreateButton ( btn1 )                     ~1503B
    setPosition ( btn1, 10, 30 )              ~1504A
    setSize ( btn1, 200, 70 )                 ~1505A
    setLabel ( btn1, FILE )                   ~1506B
    CreateDialogBox ( dialog )                ~1503C
    setDefaultMap ( dialog, Unmap )           ~1507C
        :
    CreateTextField ( text )                  ~1503D
    setCallbackFunction ( text, input )       ~1508D
        :
    setSubwindow ( main_win, btn1 )           ~1510AB
    setSubwindow ( main_win, dialog )         ~1510AC
        :
    setMapOnSelect ( btn1, dialog )           ~1511BC
    setUnmapOnSelect ( btn2, dialog )         ~1511DC
        :
```

METHOD AND APPARATUS FOR AUTOMATICALLY GENERATING A GRAPHICAL USER INTERFACE CONTROL PROGRAM

BACKGROUND OF THE INVENTION

The present invention relates to method and apparatus for automatically generating a graphical user interface (hereinafter referred to as GUI) control program, and more particularly to method and apparatus for automatically generating a GUI control program which read user prepared graphical user interface design information to automatically generate the graphical user interface control program.

An example of automatically generating a GUI control program is disclosed in the U.S. patent application Ser. No. 07/550,521 filed on Jul. 10, 1990, U.S. Pat. No. 5,228,100.

In the method for automatically generating the GUI control program disclosed in the above co-pending application, the graphical user interface control is automatically generated to control the graphical user interface for optically reading a document like a sheet, recognizing an entry field to which an operator is to input data based on a character pattern and a line pattern of the document image, and displaying a formatted document image having an empty entry field on a display screen.

However, in the method for automatically generating the GUI control program described in the above co-pending patent application, it is not possible to automatically generate the graphical user interface control program in a multi-window system in which a plurality of windows are open on one screen.

SUMMARY OF THE INVENTION

It is an object of the present invention to provide method and apparatus for automatically generating a GUI control program which automatically generate a graphical user interface program which is compatible to a multi-window system.

In a method for automatically generating a graphical user interface control program of the present invention, part definition information for defining display parts of a user interface such as a main window, a button switch, a sub-window and a dialog box, size and position information of the parts, and information for defining the relevancy of the parts are read, the part definition information, the position information and the relevancy information are recognized from the read information, a relational structure between the part structure and the parts is analyzed based on the recognized part definition information, position information and the relevancy information, and a procedure for constructing a graphical user interface control program is generated based on the part definition information, the position information, the relevancy information and the relational structure between the part structure and the parts resulting from the analysis.

An apparatus for automatically generating a graphical user interface control program comprises an input unit for reading part definition information for defining display parts of a user interface such as a main window, a button switch, a sub-window and a dialog box, size and position information of the parts, and information for defining the relevancy among the parts, a recognition unit for recognizing the part definition information, the position information and the relevancy information based on the read information, an analysis unit for analyzing a relational structure between the part structure and the parts based on the recognized part definition information, the position information and the relevancy information, and a unit for generating a procedure for constructing a graphical user interface control program based on the part definition information, the position information, the relevancy information and the relational structure between the part structure and the parts resulting from the analysis.

BRIEF DESCRIPTION OF THE DRAWINGS

FIG. 3 illustrates a function data table stored in a function definition table field, FIG. 13 shows a graphical data table generated by the image recognition process, FIG. 15 shows a structure data table generated by the structure analysis process, FIG. 17 shows a graphical user interface control program generated by the program generation process.

DESCRIPTION OF THE PREFERRED EMBODIMENTS

The present invention is now explained in detail in connection with embodiments. The present invention is not limited to the illustrated embodiments.

Figure 1:
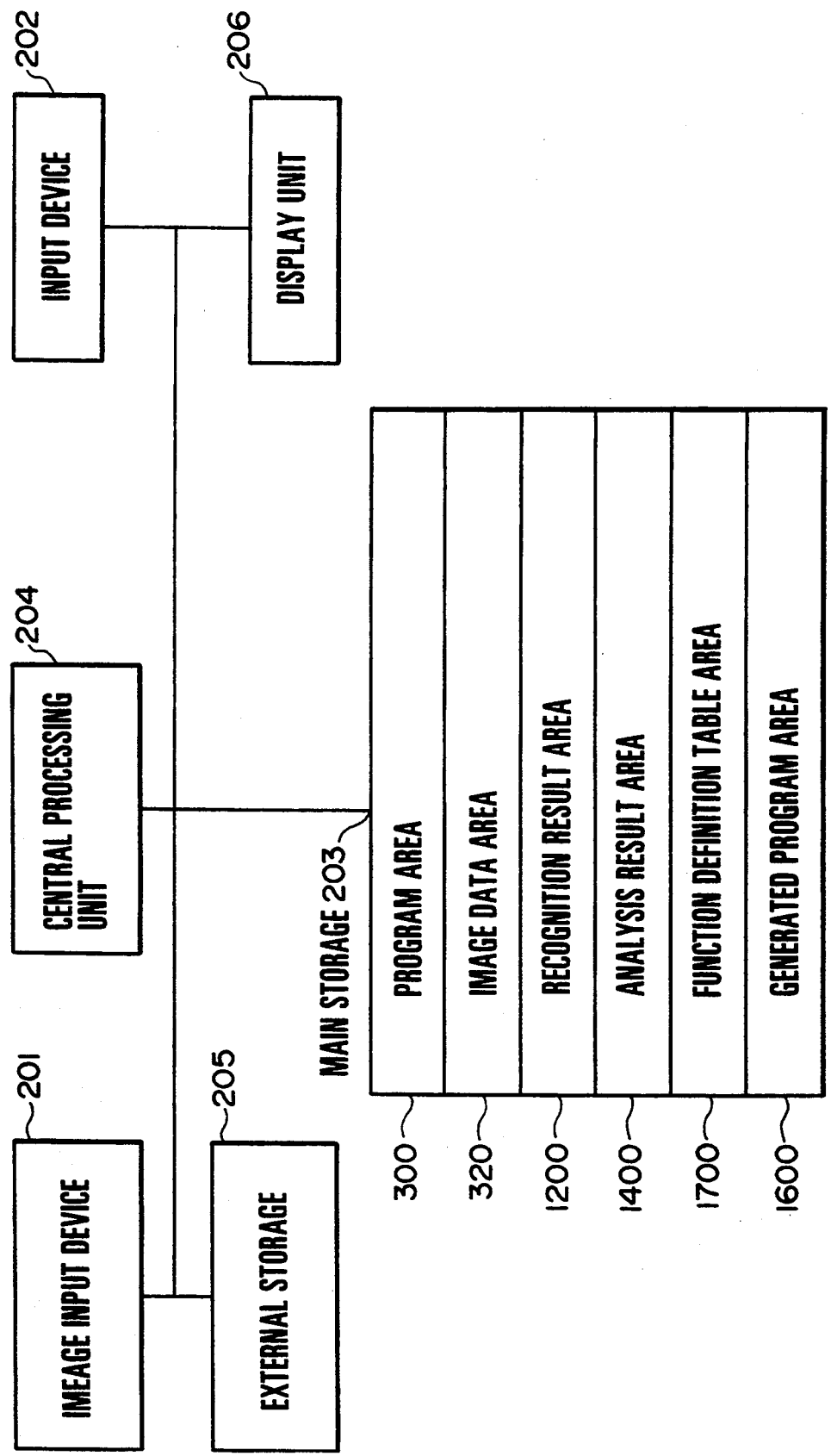
FIG. 1 shows an overall configuration of a computer system for implementing a method for automatically generating a GUI control program of the present invention.

FIG. 1 shows an overall configuration of a computer system for implementing a method for automatically generating a GUI control program of the present invention.

Numeral 201 denotes an image input device for reading a form for designing a graphical user interface, numeral 202 denotes an input device such as a mouse or a keyboard, numeral 203 denotes a main memory for storing programs and data, numeral 204 denotes a central processing unit for reading the programs and data from the main memory 203 to execute them, numeral 205 denotes an external storage and numeral 206 denotes a display device such as a bit map display.

The image input device 201 may be an optical character reader or an image scanner. It may also be a device which permits direct hand writing of characters or an image on a digital tablet such as a magnetic tablet or a liquid crystal tablet.

The main memory 203 includes a program area 300 for storing programs for implementing the method for automatically generating the GUI control program, an image data area for storing image data including characters and image read by the image input device 201, a recognition result area 1200 for storing graphical data resulting from the recognition of the image data, an analysis result area 1400 for storing structure data resulting from the analysis of the graphical data, a function definition table area 1700 for storing function data necessary to generate a graphical user interface control program and a generated program area 1600 for storing the generated graphical user interface control program.

Figure 2:
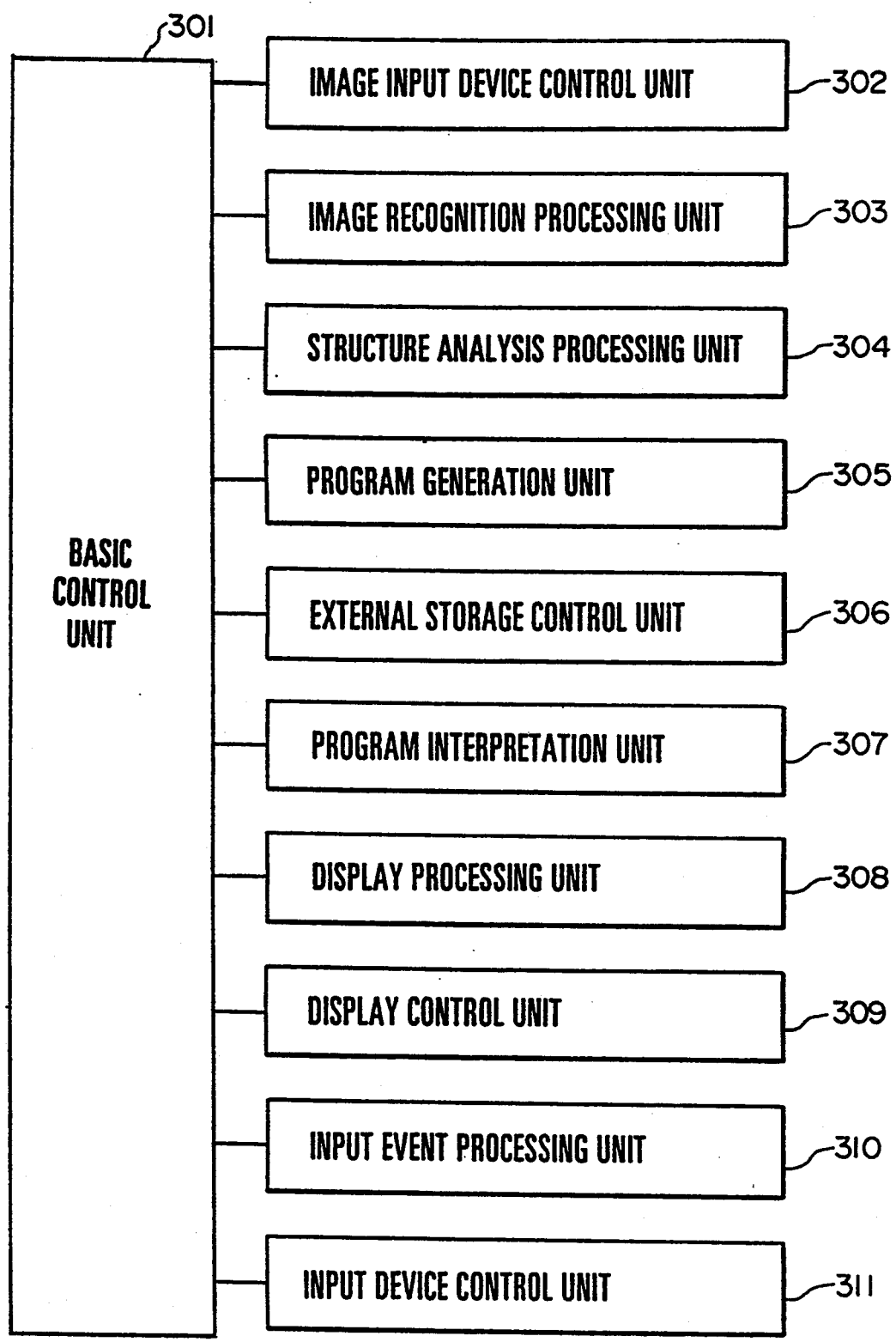
FIG. 2 shows a construction of a program for implementing the method for automatically generating a GUI control program of the present invention.

FIG. 2 shows a structure of a program for implementing the method for automatically generating the GUI control program.

Numeral 301 denotes a basic control unit for controlling the execution of the program, numeral 302 denotes an image input device control unit for reading an image from the image input device 201 and storing it in the image data area 320, numeral 303 denotes an image recognition processing unit for recognizing characters and a pattern in the image of the image data area 320 and storing the recognition result in the recognition result area 1200, numeral 304 denotes a structure analysis processing unit for analyzing the structure of the graphical user interface based on the recognition result in the recognition result area 1200 and storing the analysis result in the analysis result area 1400, and numeral 305 denotes a program generation unit for generating a graphical user interface control program based on the analysis result in the analysis result area 1400 and the function data in the function definition table area 1700 and writing it in the generated program area 1600.

Numeral 306 denotes an external storage control unit, numeral 307 denotes a program interpretation unit for interpreting a program, numeral 308 denotes a display processing unit for displaying a window or a menu, numeral 309 denotes a display control unit for displaying the display device 206, numeral 310 denotes an input event processing unit for analyzing an input event, and numeral 311 denotes an input device control unit for controlling the input device 207.

Each program is from time to time read to the program area 300 of the main memory 203 and executed by the central processing unit 204.

FIG. 3 shows a function data table stored in the function definition table area 1700. Numeral 1701 denote content of process, numeral 1702 denotes a title of function and numeral 1703 denotes a function. All functions defined by the titles of function may be known ones.

Figure 4:
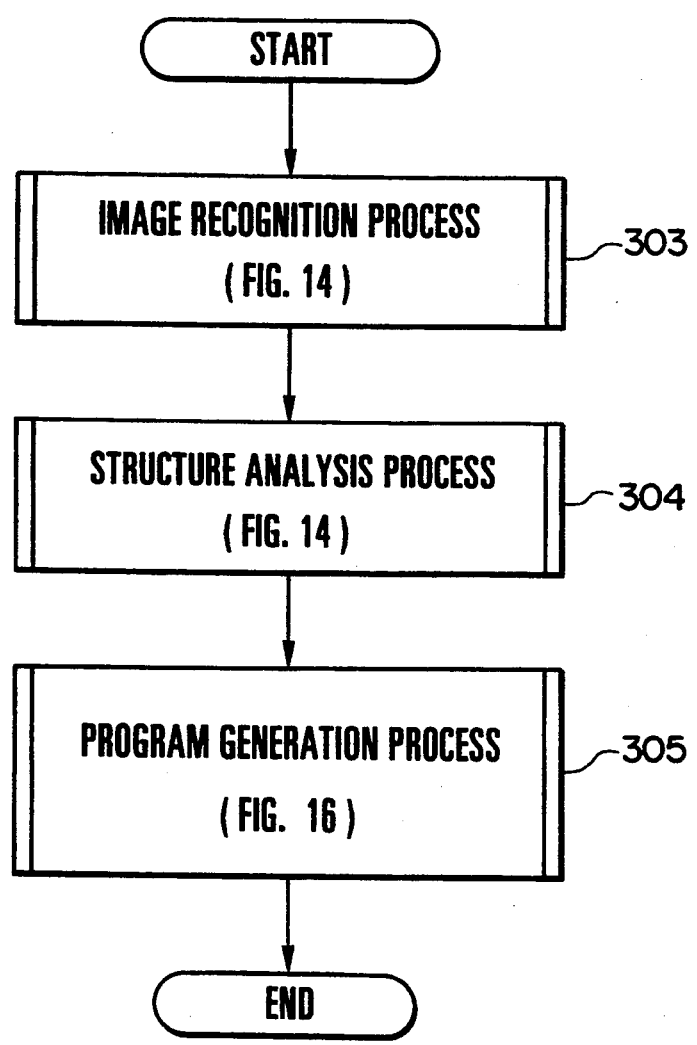
FIG. 4 shows a main flow chart of a process for implementing the method for automatically generating the GUI control program of the present invention.

FIG. 4 shows a main flow chart of a process for implementing the method for automatically generating the GUI control program.

In the image recognition process of a step 303, the image data is read from the image input device 201 and a character pattern and a line pattern are recognized. Detail thereof will be described hereinlater in conjunction with FIG. 12.

In the structure analysis process of a step 304, a structure of the graphical user interface is analyzed based on the character pattern and the line pattern recognized in the step 303. Detail thereof will be described hereinlater in conjunction with FIG. 14.

In the program generation process of a step 304, the graphical user interface control program is generated based on the analysis result of the step 304. Detail thereof will be described hereinlater in conjunction with FIG. 16.

Figure 5:
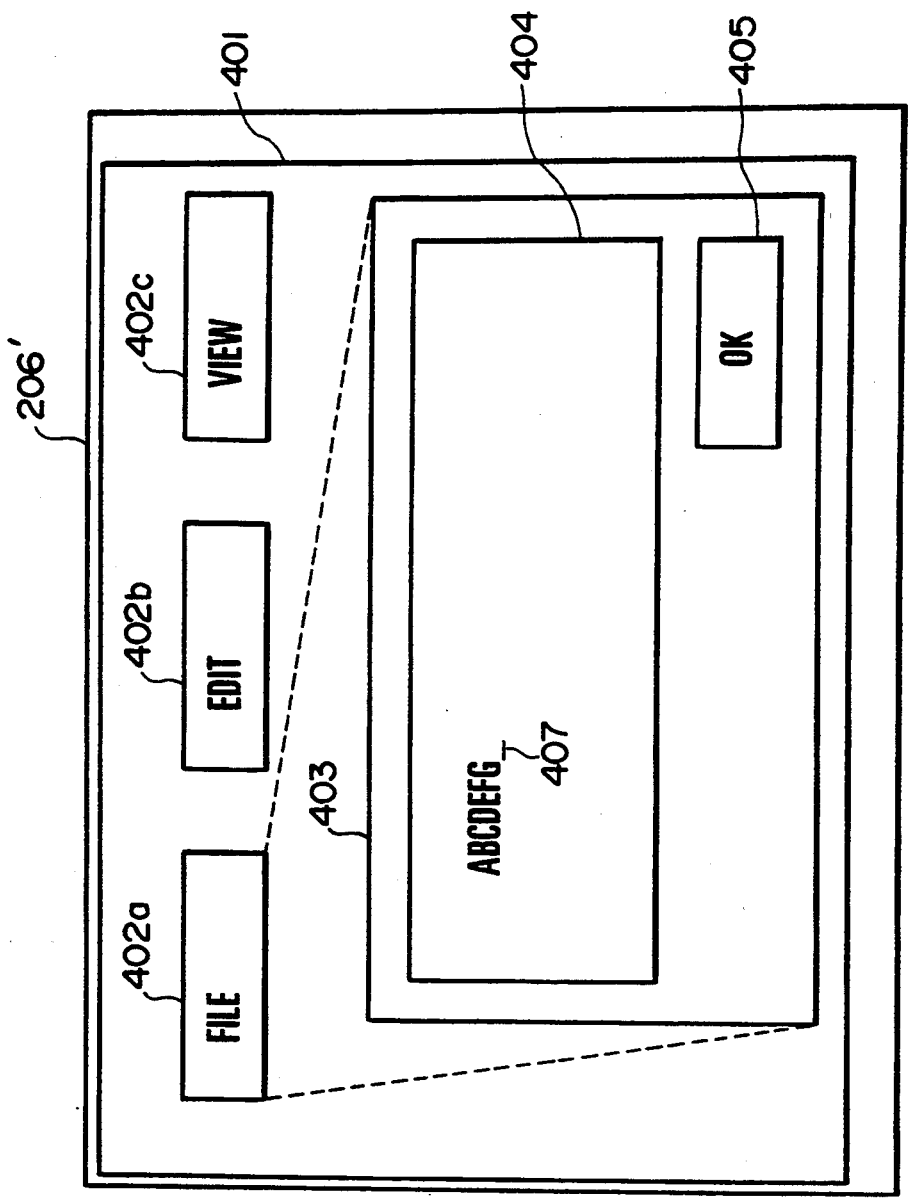
FIG. 5 illustrates a graphical user interface displayed on a screen by the GUI control program.

FIG. 5 shows a graphical user interface displayed on a screen by the GUI control program.

Numeral 401 denotes a window initially displayed on a display device 206'.

Numerals 402a to 402c denote buttons arranged on the main window 401.

Numeral 403 denotes a dialog box which is displayed on the screen when the button 402a–402c is selected by the input device 202 such as a mouse.

Numeral 404 denotes a text field in which a character string arranged on the dialog box 403 is to be entered. In the illustrated example, characters ABCDEF are inputted.

Numeral 407 denotes a cursor.

Numeral 405 denotes a button arranged on the dialog box 403. When the button is selected by the input device 202 such as the mouse, the dialog box 403 disappears from the screen.

Figure 6:
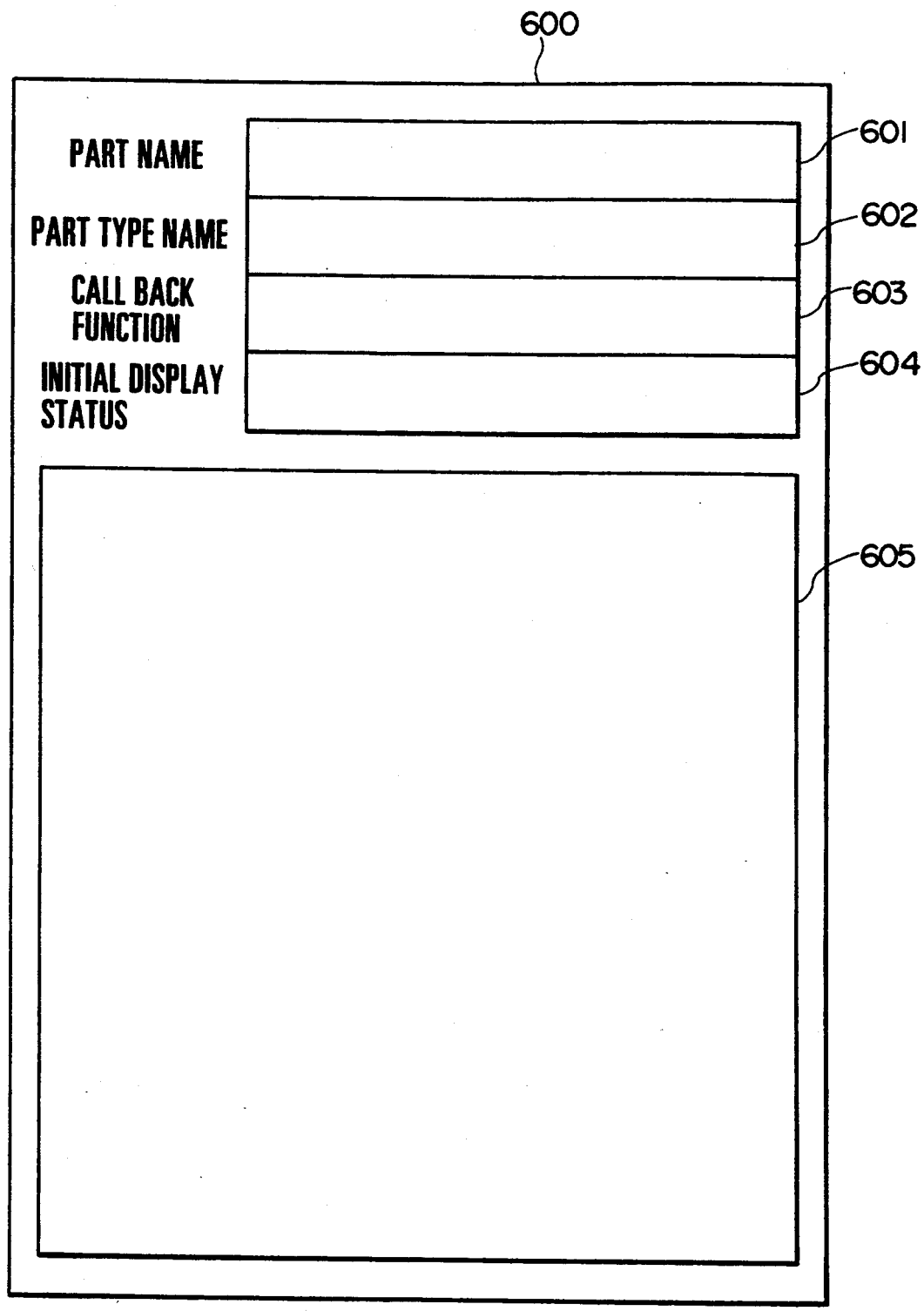
FIG. 6 shows a form for designing a graphical user interface.

FIG. 6 shows a form for designing a graphical user interface.

Numeral 601 denotes a part name column in which a user is to writes a part name of a graphical user interface defined by the form for designing the graphical user interface. Numeral 602 denotes a part type name column in which a type of the part is to be written, numeral 603 denotes a called function name column in which a name of the called function is to be written when the part is selected by the mouse or the keyboard, numeral 605 denotes a graphics area in which graphics and characters for indicating a part display position, size and label of the part and a relation to other parts are to be written.

Figure 7:
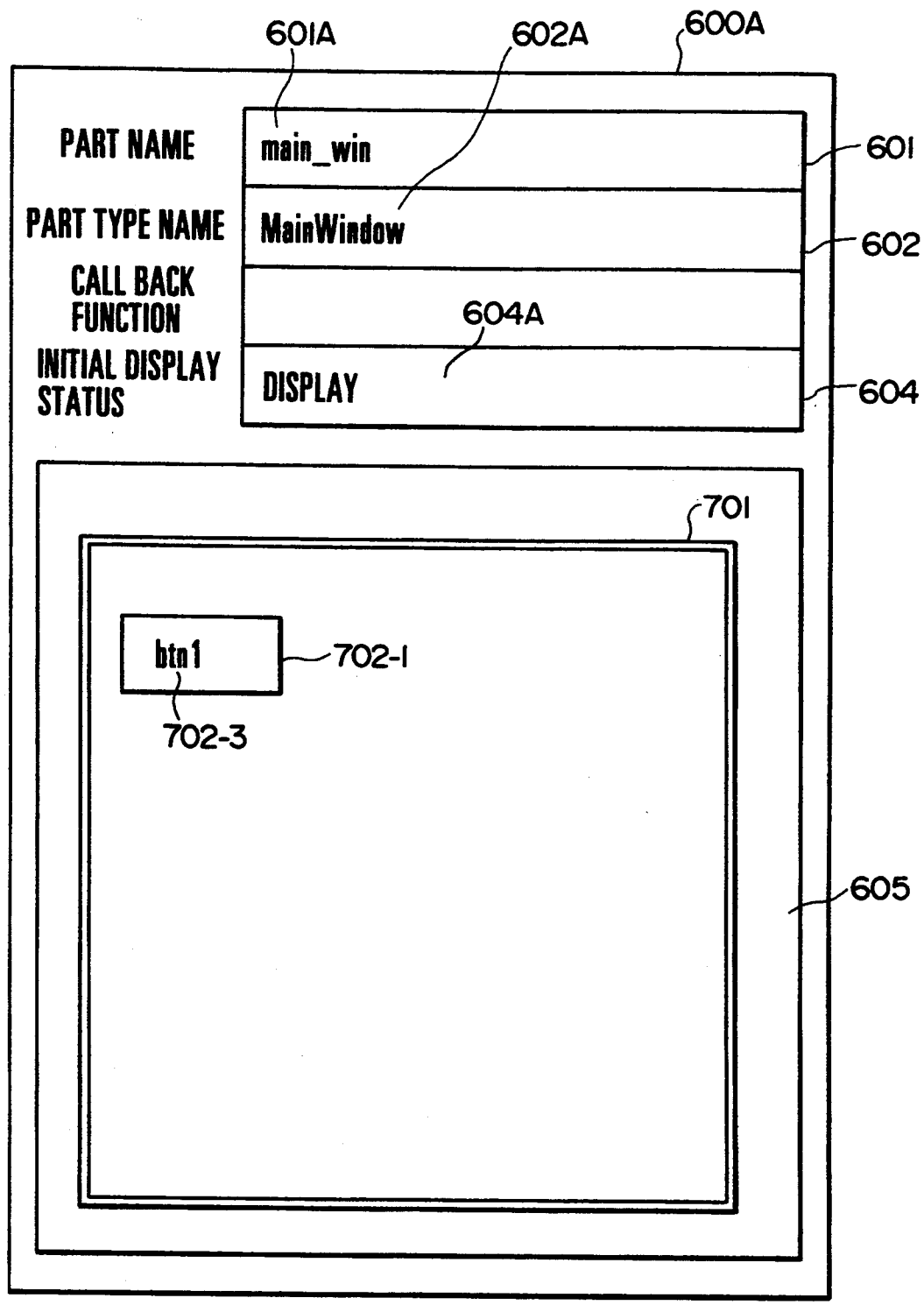
FIG. 7 shows a form for designing a graphical user interface which defines a main window.

FIG. 7 shows a form for defining a graphical user interface which defines the main window 401. Numeral 601A denotes a character string for indicating a part name of the main window 401. Numeral 602A denotes a character string for indicating a type name of the part of the main window 401. Numeral 604A denotes a character string indicating that an initial display status of the main window 401 is a display status. Numeral 701 denotes a double rectangle indicating a position and a size of the main window 401. Numeral 702-1 denotes a rectangle indicating that a button 402a is included in the main window as a sub-window. Numeral 702-3 denotes a character string indicating a part name of the button 402a.

Figure 8:
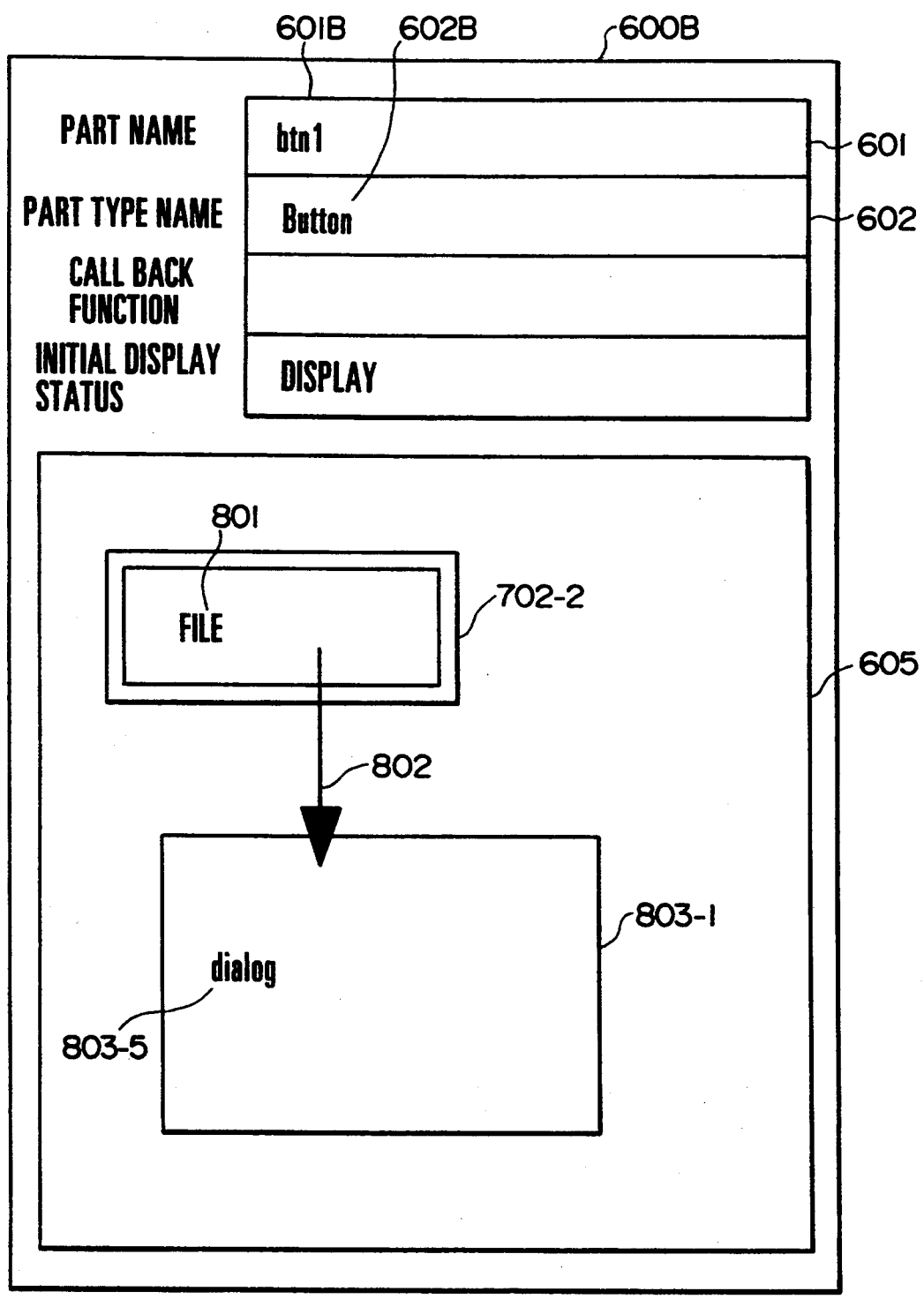
FIG. 8 shows a form for defining a graphical user interface which defines a button.

FIG. 8 shows a form for designing a graphical user interface which defines the button 402a which is one of the parts. Numeral 702-2 denotes a double rectangle indicating a size of the button 402a. Numeral 801 denotes a character string for indicating a label displayed on the button 402a. A solid line arrow 802 and a rectangle 803-1 are graphics for indicating that a dialog box 403 is displayed on a screen when the button 402a is selected. Numeral 803-5 denotes a character string for indicating a part name of the dialog box 403.

Figure 9:
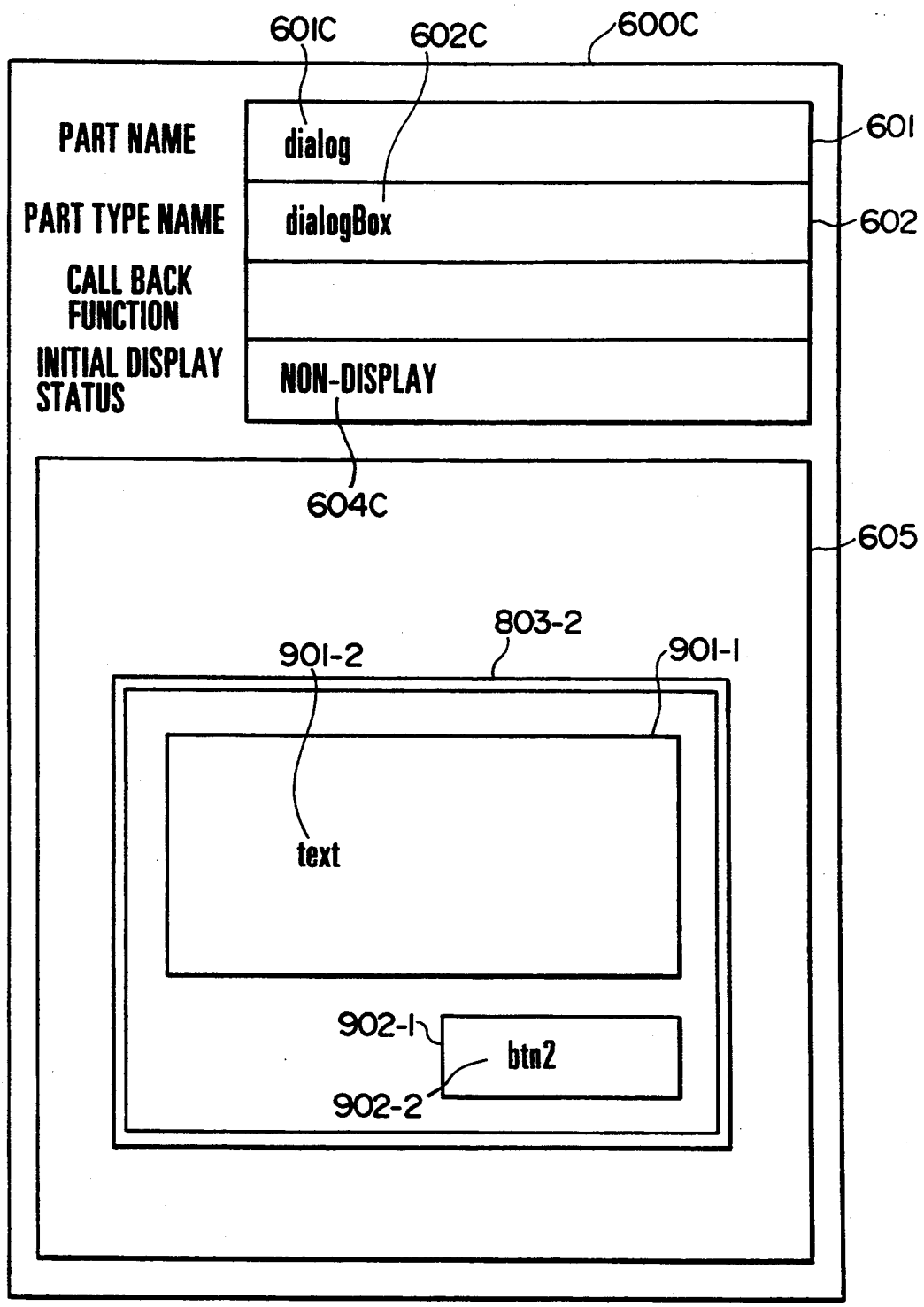
FIG. 9 shows a form for defining a graphical user interface which defines a dialog box.

FIG. 9 shows a form for defining a graphical user interface which defines the dialog box 403 which is one of the parts. Numeral 604C denotes a character string for indicating that the initial display status of the dialog box 403 is a non-display status. Numeral 803-2 denotes a double rectangle for indicating a size of the dialog box 403. Numeral 901-1 denotes a rectangle for indicating that a text field 404 is included in the dialog box 403 as a sub-window. Numeral 901-2 denotes a character string for indicating a part name of the text field 404. Numeral 902-1 denotes a rectangle for indicating that the button 405 is included in the dialog box 403 as a sub-window. Numeral 902-2 denotes a character string for indicating a part name of the button 405.

Figure 10:
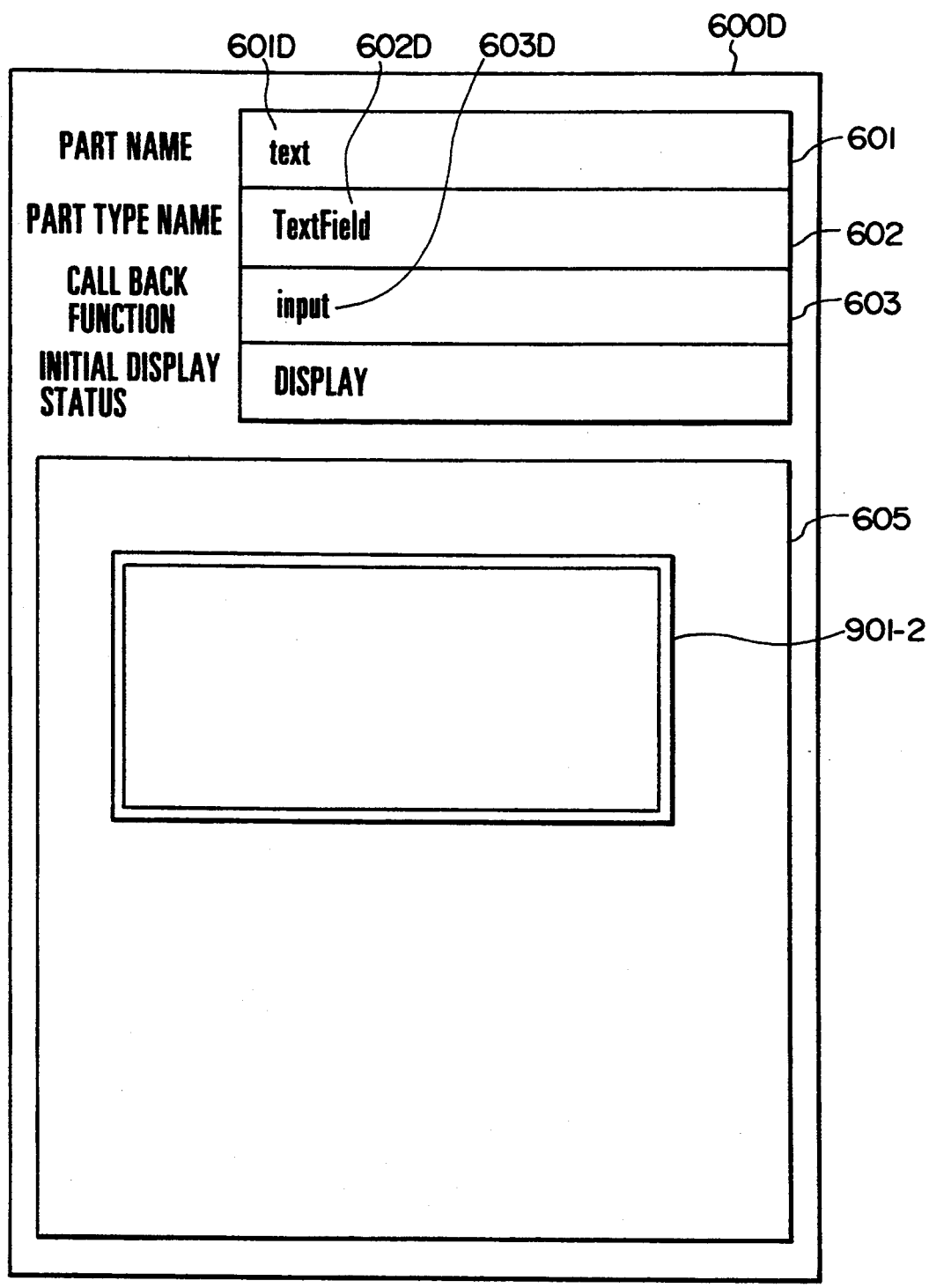
FIG. 10 shows a form for defining a graphical user interface which defines a text field.

FIG. 10 shows a form for designing a graphical user interface which defines a text field 404 which is one of the parts. Numeral 603D denotes a character string for indicating a name of function to be called when the text field 404 is selected by a key or a mouse. Numeral 901-2 denotes a double rectangle for indicating a size of the text field 404.

Figure 11:
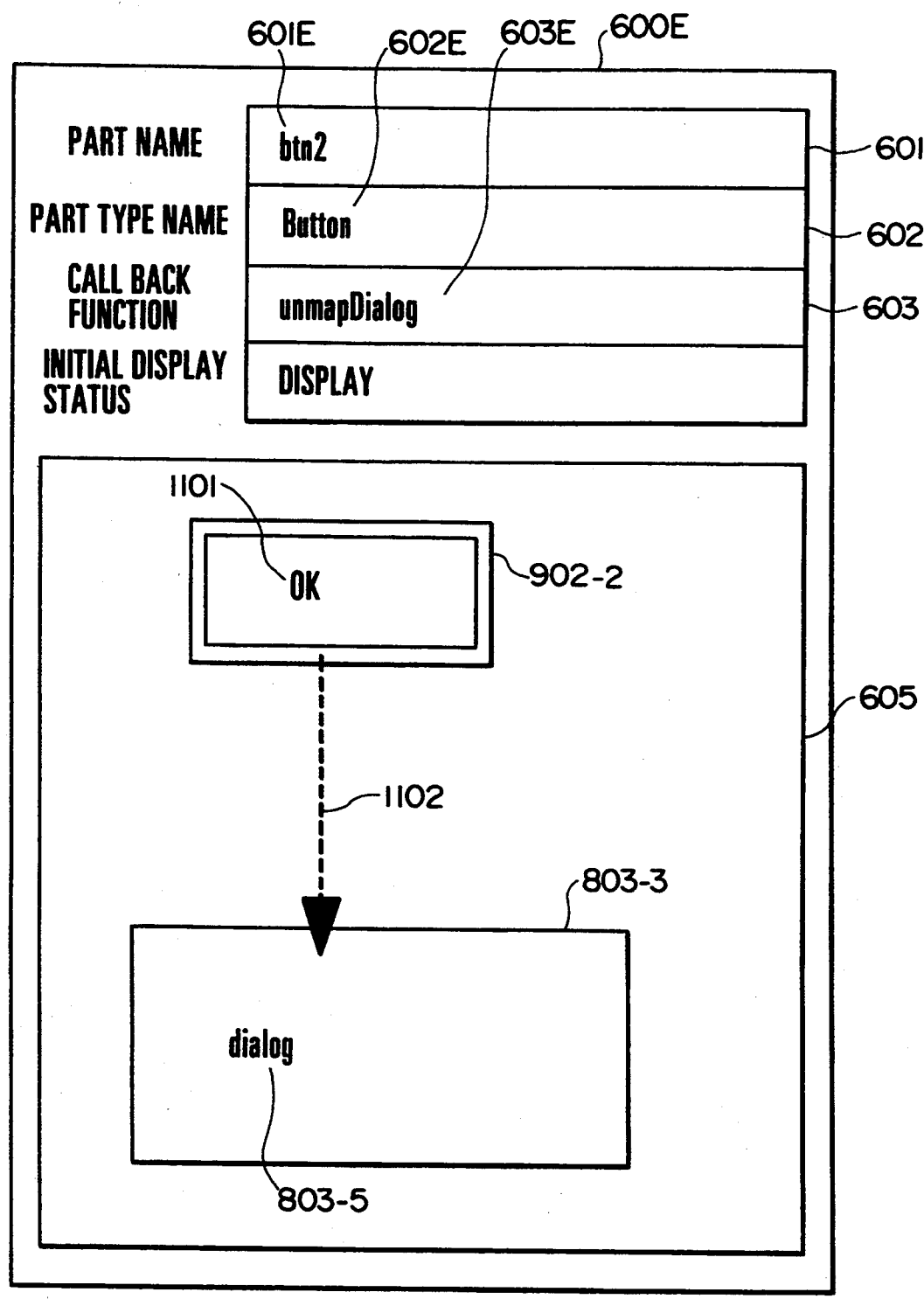
FIG. 11 shows a form for defining a graphical user interface which defines a button.

FIG. 11 shows a form for designing a graphical user interface which defines the button 405 which is one of parts. Numeral 902-2 denotes a double rectangle for indicating a size of the button 405. Numeral 1101 denotes a character string for indicating a label displayed on the button 405. A broken line arrow 1102 and a rectangle 803-3 are graphics for indicating that the dialog box 403 disappears from the screen when the button 405 is selected. Numeral 803-5 denotes a character string for indicating a part name of the dialog box 403.

A form for defining the graphical user interface is prepared for each part.

Figure 12:
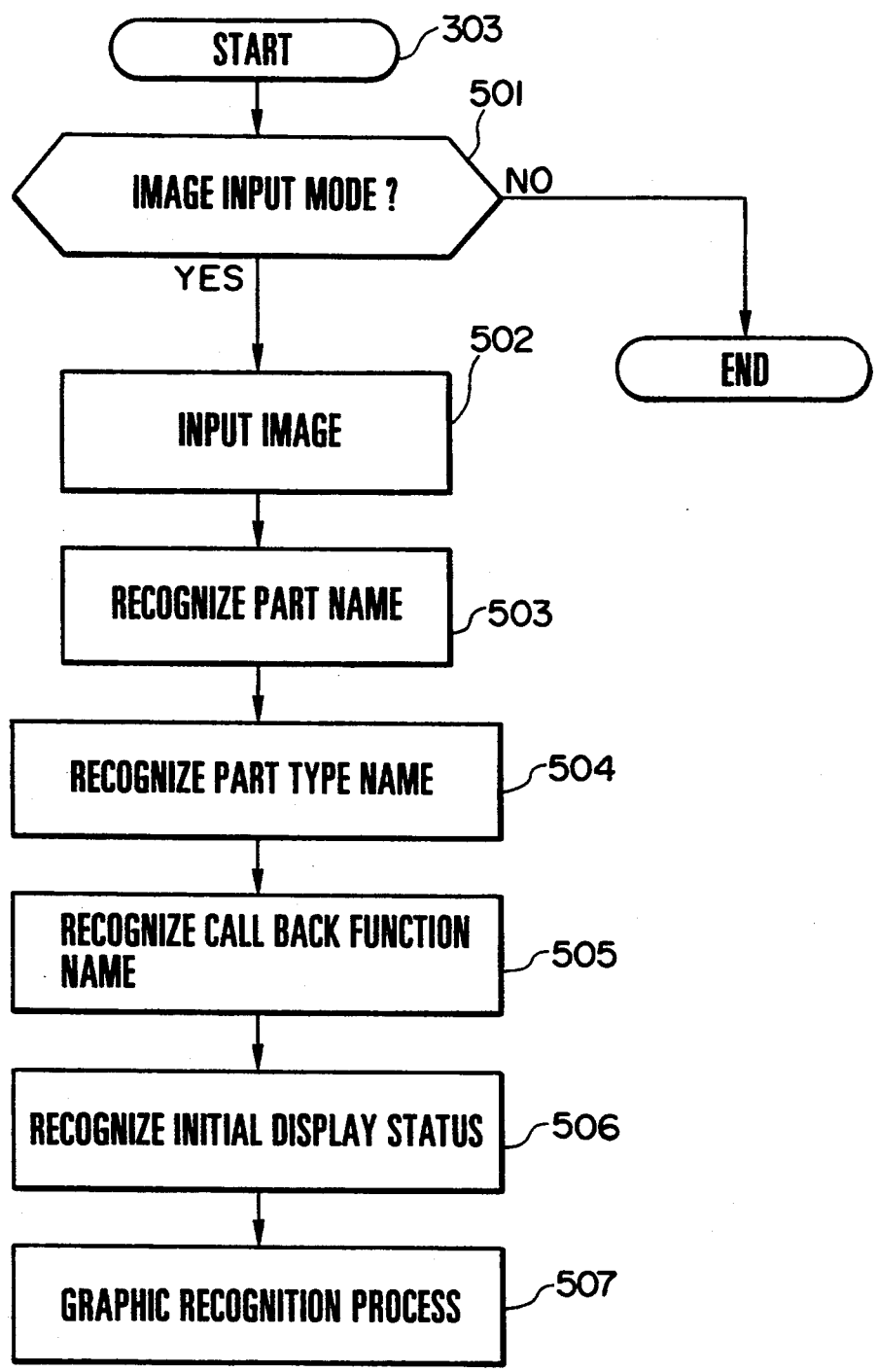
FIG. 12 shows a detailed flow chart of an image recognition process.

FIG. 12 shows a detailed flow chart of the image recognition process (the step 303 of FIG. 4).

In a step 501, whether an image is to be read or not is determined, and if it is to be read, the process proceeds to a step 502, and if it is not to be read, the process is terminated.

In a step 502, all forms for designing the graphical user interfaces prepared for the respective parts are read and the image data thereof are stored in the image data area 320. The character data may be entered from the keyboard of the input device 202.

In a step 503, the part name written from the image data of the form for designing the graphical user interface to the part name column 601 is recognized, and the recognition result is stored in the recognition result area 1200.

In a step 505, the function name written in the called function name column 603 is recognized, and the recognition result is stored in the recognition result area 1200.

In a step 506, the initial display status written in the initial display status column 604 is recognized, and the recognition result is stored in the recognition result area 1200.

In a step 507, the graphic and the characters written in the drawing column 605 are recognized and the recognition result is stored in the recognition result area 1200. The recognition process for the graphic and the characters may use a method disclosed in the patent application Ser. No. 07/550,521, U.S. Pat. No. 5,228,100.

When the process of the step 303 is executed for each of the forms for designing the graphical user interface of FIGS. 7-11, a graphic data table shown in FIG. 13 is stored in the recognition result area 1200.

In the graphic data table of FIG. 13, numerals 1200A to 1200E denote graphical data for the respective forms for designing the graphical user interface. Numeral 1200A denotes graphic data of the main window 401, numeral 1200B denotes graphic data of the button 402a, numeral 1200C denotes graphic data of the dialog box 403, numeral 1200D denotes graphic data of the text field 404, and numeral 1200E denotes graphic data of the button 405.

A header 1210 stores the data written in the part name column 601, the part type name column 602, the called function name column 603 and the initial display status column 604 of the form for designing the graphical user interface.

Graphic information fields 1220, 1230, . . . are prepared for each of the graphics written in the drawing column 605 of the form for designing the graphical user interface and store the type of graphic, position, size and character string written therein.

Figure 14:
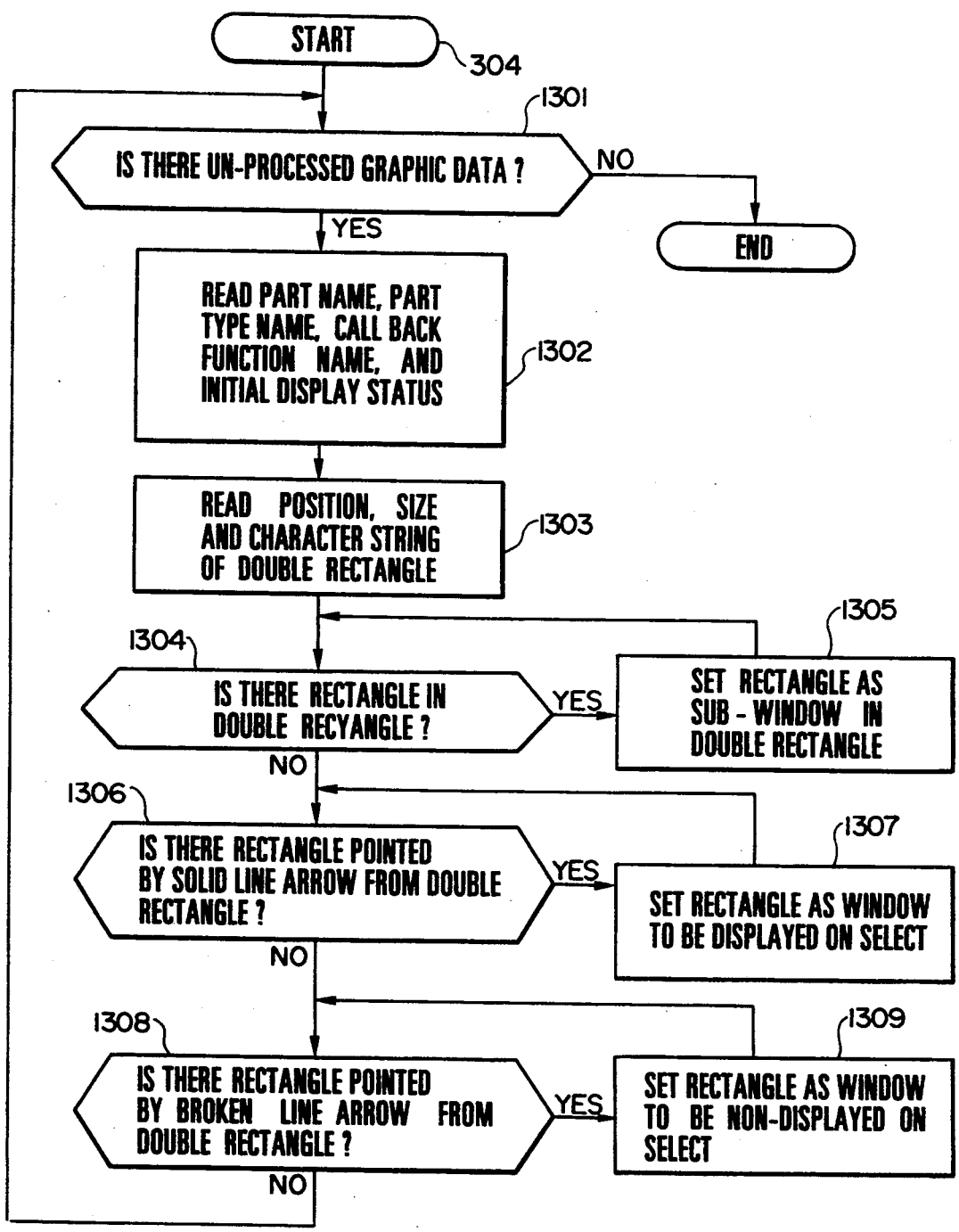
FIG. 14 shows a detailed flow chart of a structure analysis process.

FIG. 14 shows a detailed flow chart of a structure analysis process (the step 304 of FIG. 4).

In a step 1301, whether there is unanalized graphic data in the graphic data table or not is determined, and if there is, the process proceeds to a step 1302, and if there is not, the process is terminated.

In a step 1302, one graphic data is read from the graphic data table and the part name 1201, the part type name 1202, the called function name 1203 and the initial display status 1204 in the header 1210 are read and stored in the analysis result area 1400.

In a step 1303, the graphic information whose graphic type is double rectangle are extracted from the graphic information fields 1220, 1230, . . . of the graphic data and the character strings of the positions, sizes and labels thereof are stored in the analysis result area 1400.

In a step 1304, the graphic information whose graphic type is rectangle and whose position and size are included in the position and the double rectangle of the double rectangle graphic information are extracted from the graphic information fields 1220, 1230, . . . of the graphic data. If there is such information, the process proceeds to a step 1305, and if there is not, the process proceeds to a step 1306.

In the step 1305, the character string in the rectangle graphic information included in the double rectangle is stored in the analysis result area 1400 as a part name of the sub-window.

In a step 1306, whether the graphic information whose graphic type is the solid line arrow is included in the graphic information fields 1220, 1230, . . . of the graphic data or not is determined, and if it is included, the process proceeds to s step 1307, and if it is not, the process proceeds to a step 1308.

In a step 1307, an end point position of the solid line arrow is calculated based on the position and the size of the graphic information of the solid line arrow, and the graphic information which includes the end point position of the solid line arrow in the position and the size thereof is extracted from the graphic information fields 1220, 1230, . . . of the graphic data, and the character string in the graphic information is stored in the analysis result area 1400 as a part name to be displayed on select.

In a step 1308, whether the graphic information whose graphic type is the broken line arrow is included in the graphic information fields 1220, 1230, . . . of the graphic data is determined, and if it is included, the process proceeds to a step 1309, and if it is not included, the process returns to the step 1301.

In the step 1309, an end point position of the broken line arrow is calculated based on the position and the size of the graphic information of the broken line arrow, and the graphic information which includes the end point position of the broken line arrow in the position and the size thereof is extracted from the graphic information fields 1220, 1230, ... of the graphic data, and the character string in the graphic information is stored in the analysis result area 1400 as a part name to be non-displayed.

For example, when the process of the step 304 is executed to the graphic data table of FIG. 13, a structure data table as shown in FIG. 15 is stored in the analysis result area 1400. In the structure data table of FIG. 15, numeral 1400A to 1400E denote structure data corresponding to 1200A to 1200E of the graphic data table of FIG. 13. Numeral 1400A denotes structure data of the main window 401, numeral 1400B denotes structure data of the button 402a, numeral 1400C denotes structure data of the dialog box 403, numeral 1400D denotes structure data of the text field 404, and numeral 1400E denotes structure data of the button 405.

Figure 16:
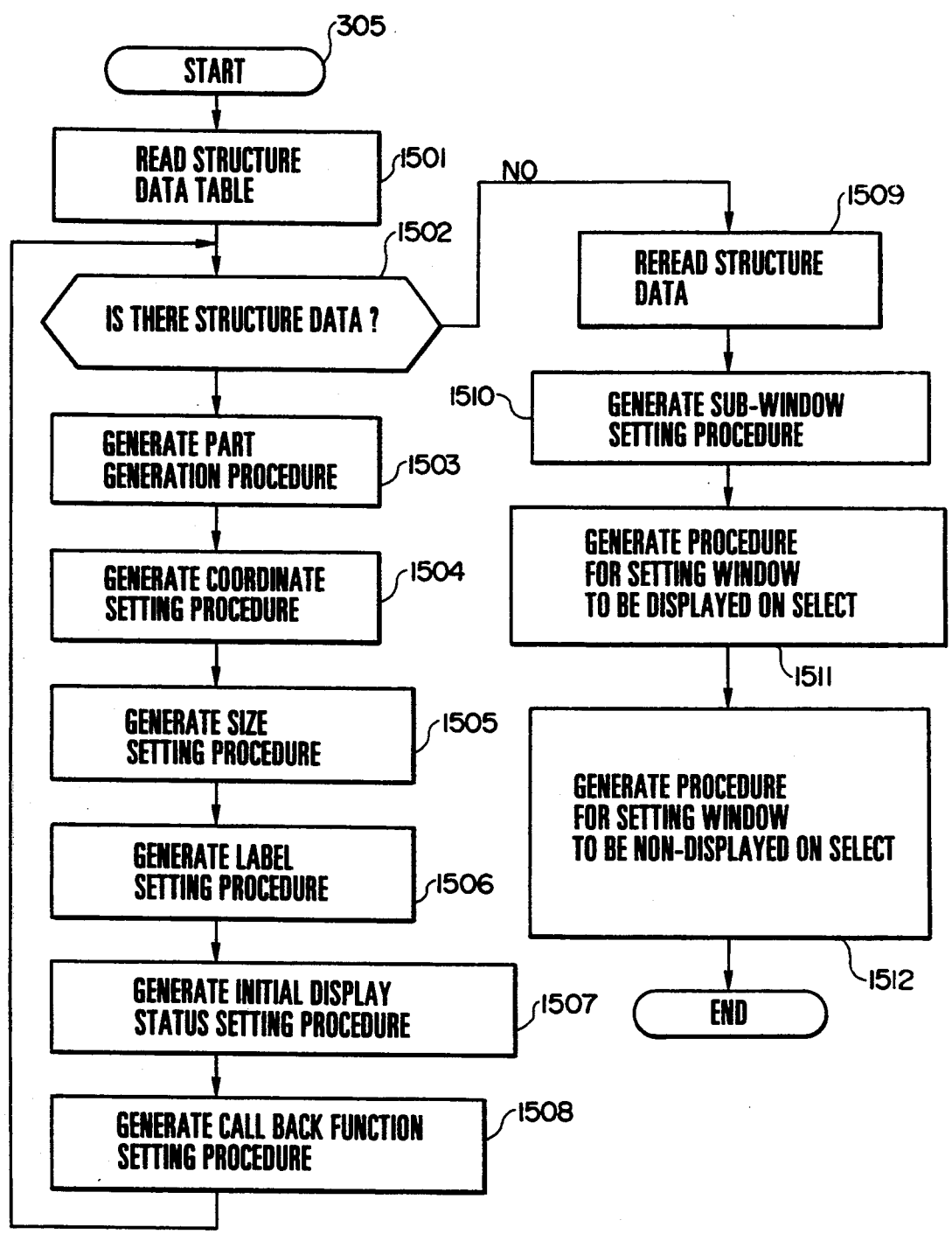
FIG. 16 shows a detailed flow chart of a program generation process.

FIG. 16 shows a detailed flow chart of the program generation process (the step 305 of FIG. 4).

In a step 1501, the structure data table is read.

In a step 1502, whether there is unprocessed structure data or not is determined, and if there is, the process proceeds to a step 1503, and if there is not, the process proceeds to a step 1509.

In the step 1503, one structure data is read from the structure data table, and a part generation procedure is generated by using the part name 1401 thereof and a part generation function (1503'-1 to 1503'-4 of FIG. 3) corresponding to the part type name 1402 thereof, and it is stored in the generated program area 1600.

In a step 1504, a coordinate setting procedure is generated by using the part name 1401 of that part, the position 1405 thereof and a coordinate setting function (1504' in FIG. 3) and it is stored in the generated program area 1600.

In a step 1505, a size setting procedure is generated by using the part name 1401 of that part, the size 1406 thereof and ta size setting function (1505' of FIG. 3), and it is stored in the generated program area 600.

In a step 1506, a label setting procedure is generated by using the part name 1401 of that part, the label 1407 thereof and a label setting function (11506' of FIG. 3), and it is stored in the generated program area 1600.

In a step 1507, an initial display status setting procedure is generated by using the part name 1401 of that part, the initial display status 1404 thereof and an initial display status setting function (1507' of FIG. 3), and it is stored in the generated program area 1600.

In a step 1508, a called function setting procedure is generated by using the part name 1401 of that part, the called function name 1403 thereof and a called function setting function (1508' of FIG. 3), and it is stored in the generated program area 1600. Then, the process returns to the step 1502.

In a step 1509, the structure data table is read again.

In a step 1510, one structure data is read from the structure data table and a sub-window setting procedure is generated by using the part name 1401 thereof, the part name of the sub-window 1408 and a sub-window setting function (1510' of FIG. 3), and it is stored in the generated program area 1600.

In a step 1511, a procedure for setting a window to be displayed at the time of selection is generated by using the part name 1401 of that part, the part name of the on-select display 1409 and an on-select display window setting function (1511' of FIG. 3), and it is stored in the generated program area 1600.

In a step 1512, a procedure for setting a window which is not displayed at the time of selection is generated by using the part name 1401 of that part, the part name of the on-select non-display 1410 and an on--select non-display window setting function (1512' of FIG. 3), and it is stored in the generated program area 1600.

For example, when the process of the step 305 is executed for the structure data table of FIG. 15, a graphical user interface control program as shown in FIG. 17 is stored in the generated program area 1600.

In the graphical user interface control program of FIG. 17, numerals 1503A, 1504A and 1505A denote the part generation procedure, the coordinate setting procedure and the size setting procedure, respectively, corresponding to the structure data 1400A of the structure data table of FIG. 15.

Numerals 1503B, 1504B, 1505B and 1506B denote the part generation procedure, the coordinate setting procedure, the size setting procedure and the label setting procedure, respectively, corresponding to the structure data 1400B of the structure data table of FIG. 15. Numeral 1503C denotes the part generation procedure corresponding to the structure data 1400C of the structure data table of FIG. 15.

Numeral 1507C denotes an initial display status setting procedure for the structure data 1400C of the structure data table of FIG. 15.

Numeral 1503D denotes a part generation procedure for the structure data 1400D of the structure data table of FIG. 15. Numeral 1508D denotes a called function setting procedure for the structure data 1400D od the structure data table of FIG. 15.

Numeral 1510AB denotes a sub-window setting procedure for the structure data 1400A of the structure data table of FIG. 15. Numeral 1510AC denotes a sub-window setting procedure for the structure data 1400C of the structure data table of FIG. 15.

Numeral 1510BC denotes an on-select display window setting procedure for the structure data 1400B of the structure data table of FIG. 15.

Numeral 1511DC denotes an on-select non-display window setting procedure for the structure data 1400D of the structure data table of FIG. 15.

The generated graphical user interface control program is supplied from the generated program area 1600 to the external storage 205 and stored therein.

When the graphical user interface control program is to be executed, the program interpretation unit 307 reads the graphical user interface control program from the external storage 205 and executes it. A technique to execute the graphical user interface control program is disclosed in "OSF/Motif Programmer's Guide", Revision 1.1, Open Software Foundation.

Where the graphic data table and the structure data table are displayed on the screen to permit the correction thereof by an editor, the correction work is facilitated.

In accordance with the method for automatically generating the GUI control program of the present invention, the graphical user interface control program can be automatically generated by simply preparing a plurality of forms for designing graphical user interface. Accordingly, the productivity of the development of the program for the graphical user interface is improved.

What is claimed is:

1. A method for automatically computer generating a graphical user interface control program in a multi-window environment of a computer, comprising the steps of:

reading part definition information for defining display parts of a user interface including a main window, a button switch, a sub-window and a dialog box, size and position information of the display parts, and information for defining relevancy of the display parts;

recognizing the part definition information, the position information and relevancy information from read information, wherein said recognizing step includes a step of recognizing the definition information on the display parts, a step of recognizing a called function name, and a step of recognizing a display size and a position of the display parts;

analyzing a relational structure between part structure and the display parts based on the recognized part definition information, position information and the relevancy information, wherein said analyzing step includes a step of reading the definition information on the display parts, the called function name and an initial display status, a step of reading the position information of the display parts and the display size and position, a step of determining whether there is another rectangle in a double rectangle in the display parts, a step of defining the other rectangle as a sub-window when the other window is present in the double rectangle, a step of determining whether there is a further rectangle pointed by a solid line arrow in the double rectangle, a step of defining to display the further rectangle pointed by the solid line arrow on an associated screen in response to a command from a predetermined button switch when the further rectangle included, a step of determining whether there is a still further rectangle pointed by a broken line arrow in the double rectangle, and a step of defining to non-display the still further rectangle pointed by the broken line arrow in response to a command from the predetermined button switch when the still further rectangle is included; and a procedure generating step including, a step of generating a procedure for generating the parts based on the definition information on the parts of a part generation function, a step of generating a procedure for setting display coordinates of the parts based on the definition information on the parts, the position information of the parts and a part coordinate setting function, a step of generating a procedure for setting a display size of the parts based on the definition information on the parts, the position information of the parts and a size setting function, a step of generating a label setting procedure based on the definition information on the parts and a label setting function, a step of generating an initial display status setting procedure based on the definition information on the parts, the initial display status and an initial display setting function, a step of generating a called function setting procedure bases on the definition information on the parts, the called function name and a called function setting function, a step of generating a sub-window setting procedure based on the definition information on the sub-window and a sub-window setting function, a step of generating a setting procedure for a window to be displayed in response to the command from said button switch based on the definition to display said further rectangle and an on-select display window setting function, and a step of generating a procedure for setting a window to be non-displayed in response to the command from said button switch based on the definition to non-display said still further rectangle and an on-select non-display window setting function.

2. An apparatus for automatically computer generating a graphical user interface control program in a multi-window environment of a computer comprising:

input means for reading part definition information for defining display parts which form parts of a user interface including a main window, a button switch, a sub-window and a dialog box, size and position information of the parts, and information for defining relevancy among the parts;

recognition means for recognizing the part definition information, the position information and relevancy information from the read information, the recognition means including, means for recognizing the definition information on the display parts, means for recognizing a called function name, and means for recognizing a display size and a position of the display parts;

analysis means for analyzing a relational structure between part structure and the parts based on the recognized part definition information, the position information and the relevancy information, wherein the analysis means includes, means for reading the definition information on the display parts, the called function name and an initial display status, means for reading the position information of the display parts and the display size and position, means for determining whether there is another rectangle in a double rectangle in the display parts, means for defining the other rectangle as a sub-window when the other window is present in the double rectangle, means for determining whether there is a further rectangle pointed by a solid line arrow in the double rectangle, means for defining to display the further rectangle pointed by the solid line arrow on an associated screen in response to a command from a predetermined button switch when the further rectangle included, means for determining whether there is a still further rectangle pointed by a broken line arrow in the double rectangle, and means for defining to non-display the still further rectangle pointed by the broken line arrow in response to a command from the predetermined button switch when the still further rectangle is included; and means for generating a procedure for constructing a graphical user interface control program based on the part definition information, the position information, the relevancy information and the relational structure between the part structure and the parts resulting from the analysis, said mean for generating a procedure including;

means for generating a procedure for generating the parts based on the definition information on the parts of a part generation function, means for generating a procedure for setting display coordinates of the parts based on the definition information on the parts, the position information of the parts and a part coordinate setting function, means for generating a procedure for setting a display size of the parts based on the definition information on the parts, the position information of the parts and a size setting function, means for generating a label setting procedure based on the definition information on the parts and a label setting function, means for generating an initial display status setting procedure based on the definition information on the parts, the initial display status and an initial display setting function, means for generating a called function setting procedure bases on the definition information on the parts, the called function name and a called function setting function, means for generating a sub-window setting procedure based on the definition information on the sub-window and a sub-window setting function, means for generating a setting procedure for a window to be displayed in response to the command from said button switch based on the definition to display said further rectangle and an on-select display window setting function, and means for generating a procedure for setting a window to be non-displayed in response to the command from said button switch based on the definition to non-display said still further rectangle and an on-select non-display window setting function.

3. An apparatus for automatically generating a graphical user interface control program according to claim 2, wherein said input means optically reads the information from a predetermined form having the part definition information, the position information and the relevancy information written therein.

4. An apparatus for automatically generating a graphical user interface control program according to claim 3, wherein said input means includes a tablet device capable of writing the part definition information, the position information and the relevancy information.

5. An apparatus for automatically generating a graphical user interface control program according to claim 3, wherein said predetermined form includes a character data area to write characters and a graphic data area to write graphics or graphics and characters.

* * * * *